United States Patent
Chen et al.

(10) Patent No.: US 11,611,801 B2
(45) Date of Patent: Mar. 21, 2023

(54) CONTROL METHOD APPLIED TO ELECTRONIC DEVICE AND ASSOCIATED ELECTRONIC DEVICE AND PROCESSOR

(71) Applicant: Realtek Semiconductor Corp., HsinChu (TW)

(72) Inventors: Zhen-Rong Chen, HsinChu (TW); Cheng-Yu Lee, HsinChu (TW); Chia-Chi Yeh, HsinChu (TW); Ming-Tsung Tsai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/191,657

(22) Filed: Mar. 3, 2021

(65) Prior Publication Data

US 2021/0352377 A1 Nov. 11, 2021

(30) Foreign Application Priority Data

May 11, 2020 (TW) .................................. 109115546

(51) Int. Cl.
*H04N 21/443* (2011.01)
*H04N 21/442* (2011.01)
(Continued)

(52) U.S. Cl.
CPC ..... *H04N 21/4436* (2013.01); *H04N 21/4424* (2013.01); *H04N 21/6106* (2013.01); *H04N 21/6373* (2013.01); *H04N 21/64761* (2013.01)

(58) Field of Classification Search
CPC ........... H04N 21/4436; H04N 21/4424; H04N 21/64761; H04N 21/6106; H04N 21/6373
See application file for complete search history.

(56) References Cited

U.S. PATENT DOCUMENTS 6,895,520 B1 * 5/2005 Altmejd ................ G06F 1/3203
713/320
9,668,277 B2 * 5/2017 Lai ..................... H04W 52/0229
(Continued)

FOREIGN PATENT DOCUMENTS

CN 105554525 A 5/2016
CN 107407957 A 11/2017
(Continued)

OTHER PUBLICATIONS

Requirements Subgroup, Context, Objectives, Use Cases and Requirements for Green MPEG, International Organisation for Standardisation, ISO/IEC JTC1/SC29/WG11, Coding of Moving Pictures and Audio, N13468, Apr. 2013, Incheon, Korea, XP030020218.
(Continued)

*Primary Examiner* — Jefferey F Harold
*Assistant Examiner* — Alexander Boyd
(74) *Attorney, Agent, or Firm* — Winston Hsu

(57) ABSTRACT

The present invention provides a control method applied to an electronic device is disclosed, wherein the electronic device includes a processor and a wireless network module, and the control method includes the steps of: generating a determination result by determining if the wireless network module needs to transmit a packet; and when the determination result indicates that the wireless network module needs to transmit the packet, reducing a frequency of a clock signal used by the processor during a packet transmission.

9 Claims, 2 Drawing Sheets

(51) Int. Cl.
  *H04N 21/61* (2011.01)
  *H04N 21/6373* (2011.01)
  *H04N 21/647* (2011.01)

(56) References Cited

U.S. PATENT DOCUMENTS

2012/0198257 A1* 8/2012 Yamamoto ............ G06F 1/3296
                                                                    713/322
2016/0274640 A1   9/2016 Persson
2016/0330397 A1* 11/2016 Wengreen ................ H04N 5/63

FOREIGN PATENT DOCUMENTS

| CN | 109862609 A  |   | 6/2019  |           |
|----|--------------|---|---------|-----------|
| JP | 2005184440 A | * | 7/2005  | ............ H04L 12/56 |
| TW | 201531099 A  |   | 8/2015  |           |

OTHER PUBLICATIONS

Bernadette Johnson, How Chromecast Works, HowStuffWorks, Jan. 29, 2014, pp. 1-17, XP055582473.

"Google Photos App's new version of photo synchronization backup teaching, be careful to delete cloud photos by mistake", https://www.playpcesor.com/2014/02/google-app.html, Feb. 28, 2014.

* cited by examiner

CONTROL METHOD APPLIED TO ELECTRONIC DEVICE AND ASSOCIATED ELECTRONIC DEVICE AND PROCESSOR

BACKGROUND OF THE INVENTION

1. Field of the Invention

The present invention relates to control method of an electronic device, and more particularly, to control method of an electronic device having wireless network module.

2. Description of the Prior Art

In a current over-the-top box (OTT box), an adaptor is usually used to connect to a commercial power for power supply. However, due to the high cost of the adaptor, some OTT boxes are designed to connect to a television (TV) via a Universal Serial Bus (USB) connector for power supply. Since most of the OTT boxes use wireless network to transmit and receive data, and a processor and a wireless network module of the OTT box are high power consuming components, the power consumed by the OTT box easily exceeds a current provided by the USB connector (an average current of USB 2.0 is about 500 mA).

SUMMARY OF THE INVENTION

It is therefore an objective of the present invention to provide a control method of an electronic device, which can avoid the processor and the wireless network module having high power consumption at the same time, to solve the above-mentioned problems.

In one embodiment of the present invention, a control method applied to an electronic device is disclosed, wherein the electronic device includes a processor and a wireless network module, and the control method includes the steps of: generating a determination result by determining if the wireless network module needs to transmit a packet; and when the determination result indicates that the wireless network module needs to transmit the packet, reducing a frequency of a clock signal used by the processor during a packet transmission.

In another embodiment of the present invention, an electronic device including a processor and a wireless network module is disclosed. In the operations of the electronic device, the wireless network module is configured to wirelessly transmit at least one packet, and when the processor knows that the wireless network module is to perform wireless transmission, the processor reduces a frequency of a clock signal used by the processor during the wireless network module transmitting a packet.

In another embodiment of the present invention, a processor within an electronic device is disclosed, wherein the processor is coupled to a wireless network module, an when the wireless network module needs to transmit a packet, the processor first reduces a frequency of a clock signal used by the processor, then the processor sets a timer and notifies the wireless network module to start to transmit the packet; and when a time set by the timer expires, the processor increases the frequency of the clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
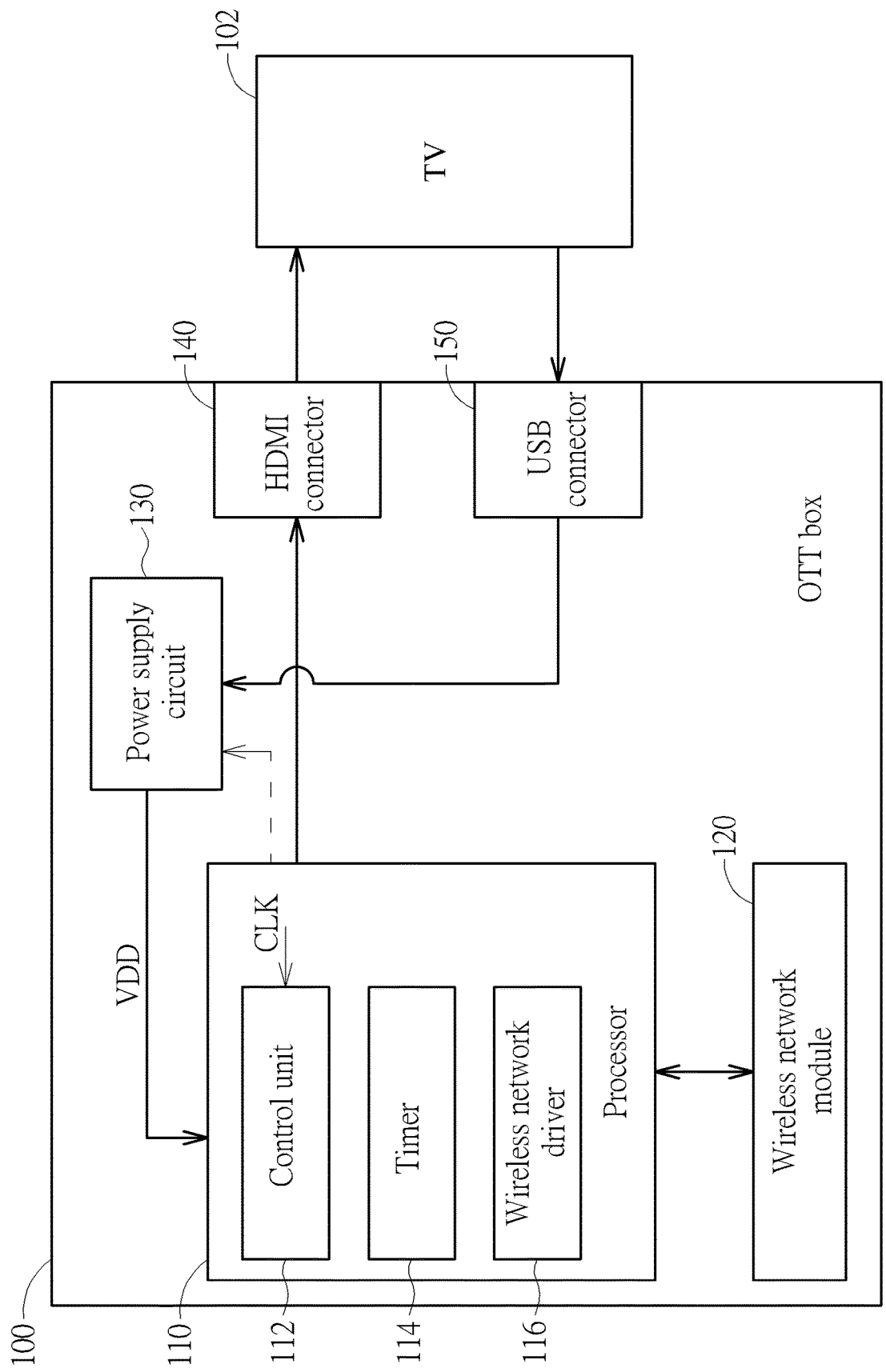
FIG. 1 is a diagram illustrating an electronic device according to one embodiment of the present invention.

FIG. 1 is a diagram illustrating an electronic device according to one embodiment of the present invention, wherein an OTT box 100 serves as the electronic device in this embodiment. As shown in FIG. 1, the OTT box 100 comprises a processor 110, a wireless network module 120, a power supply circuit 130, a High Definition Multimedia Interface (HDMI) connector 140 and a USB connector 150, wherein the processor 110 comprises at least a control unit (control circuit) 112, a timer 114 and a wireless network driver (e.g. Wi-Fi driver) 116. In this embodiment, the power supply circuit 130 in the OTT box receives a DC voltage from a TV 102 through the USB connector 150 and generates a supply voltage VDD to supply power to components inside the OTT box 100. That is, the OTT box 100 does not need to connect to any external power supply using commercial power.

In a basic operation of the OTT box 100, the processor 110 continuously receives external audio and video streams through the wireless network module 120, and converts the received audio and video streams into audio and video signals conforming to the HDMI specification, and the audio and video signals are sent to the TV 102 through the HDMI connector 140 for playback. In addition, the OTT box 110 itself sometimes needs to transmit the packet to an external electronic device through the wireless network module 120. In this embodiment, the OTT box 100 is powered by the USB connector 150 with a low current, and the processor 110 and the wireless network module 120 are high power consuming components. Therefore, in order to avoid that the current provided by the USB connector 150 is lower than the power consumption of the OTT box 100, the processor 110 and the wireless network module 120 will be controlled to not have high power consumption at the same time by using the control method of the present invention. Specifically, because the wireless network module 120 has a higher power consumption when transmitting/broadcasting packets, the processor 110 reduces a frequency of a clock signal CLK used by the processor 110 during the packet transmission of the wireless network module 120, and/or notifies the power supply circuit 130 to reduce a voltage level of the supply voltage VDD, so as to avoid the processor 110 and the wireless network module 120 having high power consumption at the same time.

In detail, when the wireless network driver 116 in the processor 110 needs to transmit the packet(s) through the wireless network module 120, the wireless network driver 116 will first notify the control unit 112 via an application programming interface (API) to reduce the frequency of the clock signal CLK used by the control unit 112. In another embodiment, the control unit 112 may also notify the power supply circuit 130 to reduce the voltage level of the supply voltage VDD. After the frequency of the clock signal CLK reduces, and/or the voltage level of the supply voltage VDD reduces, the control unit 112 sets a timer 114 to set a preset time, and then the wireless network driver 116 starts to transmit one or more packets to an external electronic device via the wireless network module 120, wherein the preset time is used to indicate the transmission time of the one or more packets. When the preset time set by the timer 114 expires, it means that the packet of the wireless network module 120 has been transmitted. At this time, the control unit 112 increases the frequency of the clock signal CLK (for example, return to the original frequency), and/or notify the power supply circuit 130 to increase the voltage level of the supply voltage VDD (e.g. return to the original voltage level).

Figure 2:
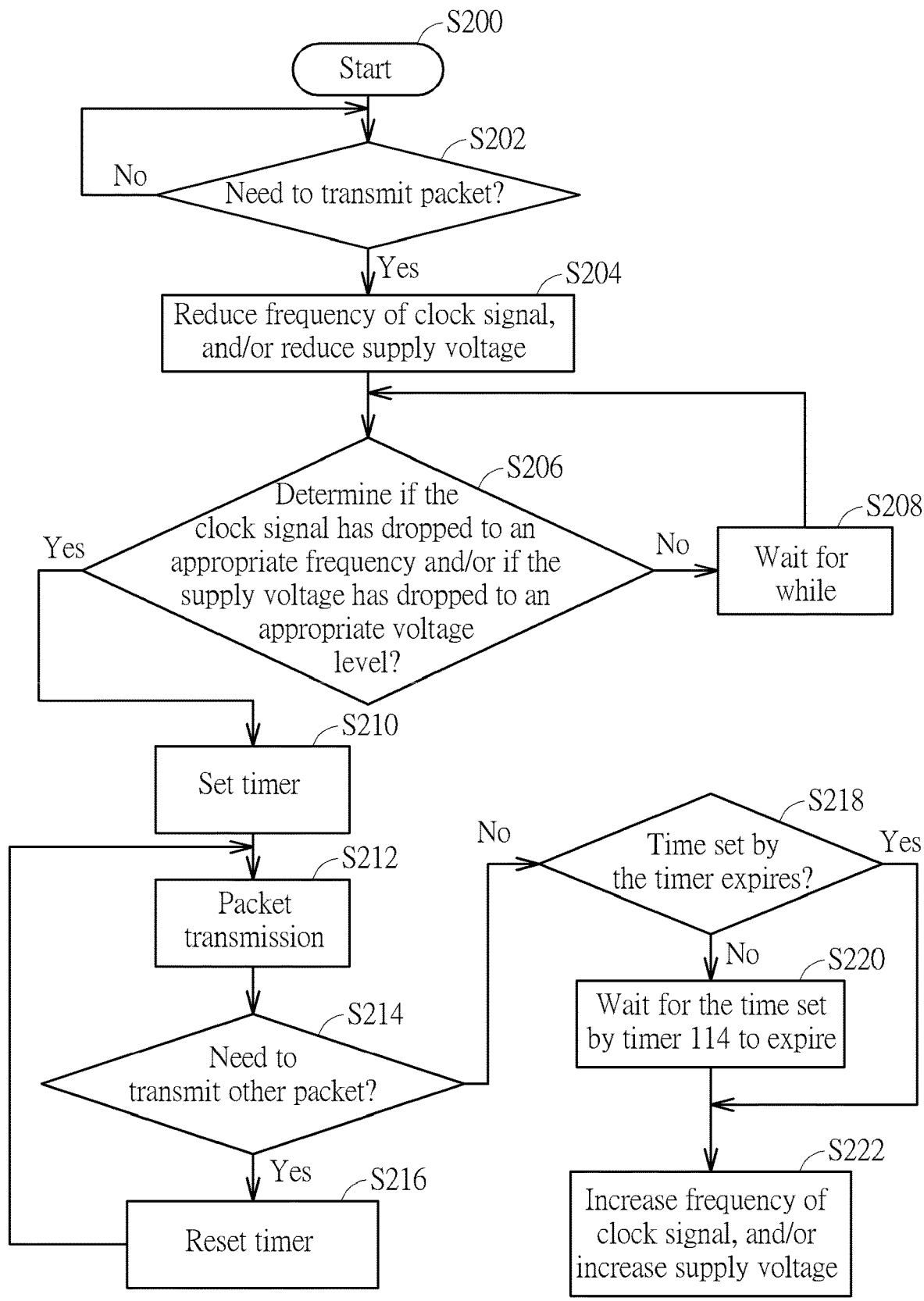
FIG. 2 is a flowchart of a control method applied to the OTT box according to one embodiment of the present invention.

FIG. 2 is a flowchart of a control method applied to the OTT box according to one embodiment of the present invention. Referring to FIG. 1 and FIG. 2 together, the flow of the control method is described as follows.

Step S200: the flow starts.

Step S202: the processor 110 determines if the wireless network module 120 needs to transmit a packet to generate a determination result. If the determination result indicates that the wireless network module 120 needs to transmit the packet, the flow enters Step S204; and if no packet is to be transmit, the flow stays in Step S202.

Step S204: reduce the frequency of the clock signal CLK used by the processor 110, and/or reduce the supply voltage VDD.

Step S206: determine if the clock signal CLK has dropped to an appropriate frequency and/or if the supply voltage VDD has dropped to an appropriate voltage level. If yes, the flow enters Step S210; if not, the flow returns to step S206.

Step S208: wait for a while, and the flow goes back to Step S206.

Step S210: set the timer 114.

Step S212: the wireless network module 120 starts to transmit the packet.

Step S214: determine if the wireless network module 120 needs to transmit other packets, if yes, the flow enters Step S216; if not, the flow enters Step S218.

Step S216: reset the timer 114.

Step S218: determine if the time set by the timer 114 has expired, if yes, the flow enters Step S222; if not, the flow enters Step S220.

Step S220: wait for the time set by timer 114 to expire.

Step S222: increase the frequency of the clock signal CLK used by the processor 110, and/or increase the supply voltage VDD of the processor 110.

It should be noted that in the embodiments shown in FIG. 1 and FIG. 2, the OTT box 100 is used as an example, but this feature is not a limitation of the present invention. In other embodiments, as long as an electronic device has a processor and a wireless network module, and the power provided to the electronic device has a lower current, the control method of the present invention can be applied to any other suitable electronic devices.

In the embodiment shown in FIG. 1, the OTT box 100 uses the USB connector 150 to receive the DC voltage from the TV 102, however, this feature is not a limitation of the present invention. As long as the power provided to the TV box 100 has a lower current, such as a low-end power supply, the USB connector 150 can also be replaced with another power connector.

Briefly summarized, in the control method of the electronic device of the present invention, by reducing the frequency of the clock signal used by the processor and/or reducing the level of the supply voltage of the processor during the packet transmission, it can avoid that the processor and the wireless network module have high power consumption at the same time (that is, have high current at the same time), so that the electronic device can use a power supply with a lower current to reduce manufacturing costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method applied to an electronic device, wherein the electronic device comprises a processor circuit and a wireless network module circuit, and the control method comprises the steps:

generating a determination result by determining if the wireless network module circuit needs to transmit a packet; and when the determination result indicates that the wireless network module circuit needs to transmit the packet, reducing a frequency of a clock signal used by the processor circuit during a packet transmission;

wherein the step of when the determination result indicates that the wireless network module circuit needs to transmit the packet, reducing the frequency of the clock signal used by the processor circuit during the packet transmission comprises:

when the determination result indicates that the wireless network module circuit needs to transmit the packet, reducing the frequency of the clock signal used by the processor circuit;

after the frequency of the clock signal used by the processor circuit is reduced, setting a timer to set a preset time, and starting to control the wireless network module circuit to transmit the packet, wherein the preset time indicates a transmission time of the packet;

before a time set by the timer expires, determining whether the wireless network module circuit needs to transmit another packet and in response to the wireless network module circuit needing to transmit the another packet, resetting the timer; and when the time set by the timer expires, increasing the frequency of the clock signal used by the processor circuit.

2. The control method of claim 1, further comprising: when the determination result indicates that the wireless network module circuit needs to transmit the packet, reducing a voltage level of a supply voltage of the processor circuit during the packet transmission.

3. The control method of claim 1, wherein the electronic device is an over-the-top box (OTT box).

4. An electronic device, comprising:

a processor circuit; and a wireless network module circuit, configured to wirelessly transmit packets;

wherein when the processor circuit knows that the wireless network module circuit is to perform wireless transmission, the processor circuit reduces a frequency of a clock signal used by the processor circuit during the wireless network module circuit transmitting a packet;

wherein when the wireless network module circuit needs to transmit the packet, the processor circuit first reduces the frequency of the clock signal, then the processor circuit sets a timer to set a preset time, and notifies the wireless network module circuit to start to transmit the packet, wherein the preset time indicates a transmission time of the packet; and before a time set by the timer expires, the processor circuit determines whether the wireless network module circuit needs to transmit another packet, and in response to the wireless network module circuit needing to transmit the another packet, the processor circuit resets the timer; and when the time set by the timer expires, the processor circuit increases the frequency of the clock signal.

5. The electronic device of claim 4, further comprising:
a power supply circuit, configured to provide a supply voltage to the processor circuit;
wherein when the wireless network module circuit transmits the packet, the processor circuit notifies the power supply circuit to reduce a voltage level of the supply voltage during the wireless network module circuit transmitting the packet.

6. The electronic device of claim 4, wherein the electronic device is an over-the-top box (OTT box), and the electronic device receives a supply voltage via an universal serial bus (USB) connector.

7. A processor circuit within an electronic device, wherein the processor circuit is coupled to a wireless network module circuit, and when the wireless network module circuit needs to transmit a packet, the processor circuit first reduces a frequency of a clock signal used by the processor circuit, then the processor circuit sets a timer to set a preset time and notifies the wireless network module circuit to start to transmit the packet, wherein the preset time indicates a transmission time of the packet; and before a time set by the timer expires, the processor circuit determines whether the wireless network module circuit needs to transmit another packet, and in response to the wireless network module circuit needing to transmit the another packet, the processor circuit resets the timer; and when the time set by the timer expires, the processor circuit increases the frequency of the clock signal.

8. The processor circuit of claim 7, wherein when the wireless network module circuit needs to transmit the packet, the processor circuit notifies a power supply circuit to reduce a voltage level of a supply voltage during a packet transmission.

9. The processor circuit of claim 7, wherein the electronic device is an over-the-top box (OTT box).

\* \* \* \* \*